(12) United States Patent
Yano et al.

(10) Patent No.: US 7,734,937 B2
(45) Date of Patent: Jun. 8, 2010

(54) POWER SUPPLY DEVICE CAPABLE OF SUPPLYING LARGE AMOUNT OF POWER NECESSARY FOR ENTIRE SYSTEM OPERATION

(75) Inventors: Tetsuya Yano, Yokohama (JP); Kazuo Ogawa, Yokohama (JP); Toshitaka Semma, Yamato (JP); Yoshihisa Kimura, Kawasaki (JP); Kazuhito Kishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 556 days.

(21) Appl. No.: 11/678,854

(22) Filed: Feb. 26, 2007

(65) Prior Publication Data
US 2007/0200432 A1  Aug. 30, 2007

(30) Foreign Application Priority Data
Feb. 24, 2006  (JP) .............................. 2006-049221

(51) Int. Cl.
G06F 1/26  (2006.01)
(52) U.S. Cl. ........................................ 713/300; 399/88
(58) Field of Classification Search ................. 713/300; 399/88
See application file for complete search history.

(56) References Cited

U.S. PATENT DOCUMENTS

| | | | |
|---|---|---|---|
| 6,542,705 B2 | 4/2003 | Fujita et al. |
| 7,002,112 B2 | 2/2006 | Kishi et al. |
| 7,054,570 B2 | 5/2006 | Kishi et al. |
| 7,116,923 B2 | 10/2006 | Kishi et al. |
| 7,130,555 B2 | 10/2006 | Kishi et al. |
| 2004/0245235 A1 | 12/2004 | Kishi et al. |
| 2004/0245241 A1 | 12/2004 | Kishi et al. |
| 2005/0123315 A1 | 6/2005 | Kishi et al. |
| 2005/0139584 A1 | 6/2005 | Kishi et al. |
| 2005/0175368 A1 | 8/2005 | Matsusaka et al. |
| 2005/0175370 A1 | 8/2005 | Matsusaka et al. |
| 2005/0191078 A1 | 9/2005 | Kishi et al. |
| 2006/0039713 A1 | 2/2006 | Kishi et al. |

(Continued)

FOREIGN PATENT DOCUMENTS

JP  2004-236492  8/2004

(Continued)

OTHER PUBLICATIONS

U.S. Appl. No. 11/679,522, filed Feb. 27, 2007, Yano.

*Primary Examiner*—Nitin C Patel
(74) *Attorney, Agent, or Firm*—Oblon, Spivak, McClelland, Maier & Neustadt, L.L.P.

(57) ABSTRACT

A power supply device includes a first power-supply unit to input external power and to output first power supplying a predetermined constant voltage to a load, a second power-supply unit to accumulate charge and to output second power to the load in parallel with the first power being supplied from the first power-supply unit, and a controller to output a control signal to prevent the second power-supply unit from supplying power in case of a current increase due to a dynamic load change, and to cause the first power-supply unit to supply power for the dynamic current increase. The first power-supply unit supplies power having a current value smaller than a predetermined maximum current of the first power-supply unit. The second power-supply unit supplies power for a shortfall current exceeding the predetermined maximum current of the first power-supply unit.

12 Claims, 11 Drawing Sheets

U.S. PATENT DOCUMENTS

| | | |
|---|---|---|
| 2006/0051111 A1 | 3/2006 | Kishi et al. |
| 2006/0051112 A1 | 3/2006 | Matsusaka et al. |
| 2006/0051113 A1 | 3/2006 | Kishi et al. |
| 2006/0051119 A1 | 3/2006 | Kishi et al. |
| 2006/0051120 A1 | 3/2006 | Kishi et al. |
| 2006/0051121 A1 | 3/2006 | Matsusaka et al. |
| 2006/0127118 A1 | 6/2006 | Kishi et al. |
| 2006/0237446 A1 | 10/2006 | Kishi et al. |

FOREIGN PATENT DOCUMENTS

| | | |
|---|---|---|
| JP | 2005-221674 | 8/2005 |

POWER SUPPLY DEVICE CAPABLE OF SUPPLYING LARGE AMOUNT OF POWER NECESSARY FOR ENTIRE SYSTEM OPERATION

CROSS-REFERENCE TO RELATED APPLICATIONS

This patent specification is based on Japanese patent application No. 2006-049221 filed on Feb. 24, 2006 in the Japan Patent Office, the entire contents of which are hereby incorporated by reference herein.

BACKGROUND OF THE INVENTION

1. Field of the Invention

The present invention relates to a power supply device, and more particularly to a power supply device capable of supplying a large amount of power necessary for an entire system operation.

2. Discussion of the Background

In recent years, copiers, printers, facsimile machines, and machines combining these devices employing an electrophotographic process have become multifunctional, resulting in a more complicated structure and a higher maximum power consumption. There has been a tendency to increase the power supplied to a fixing heater in such an image forming apparatus to reduce the waiting time for an operator of the image forming apparatus due to factors in the image forming apparatus, such as the rising time of a fixing unit or a temporary interruption in a printing or copying process in the case of a reduction in the fixing temperature.

At the same time, the power that can be supplied from a normal power line is limited. This poses a large obstacle to the design of such devices. Measures have been taken not to exceed the maximum amount of power that can be supplied from the power line. In a background power supply device and an image forming apparatus, the power supply device estimates the power consumption, and, when the estimated power consumption exceeds the maximum amount of power that can be supplied from a main power source, the power from the main power source and the power from an auxiliary power source are alternately supplied to a certain load using a switching circuit.

In another background image forming apparatus, a constant voltage source circuit is used as an auxiliary power source, and its output voltage is set higher than that of a main power source. A diode for stopping the backflow to the main power source is placed on a power feeding line for feeding power from the main power source to a load. A switch or another diode is placed between the diode and the load on the power feeding line. The output voltage of the auxiliary power source is applied to the power feeding line. As long as the output voltage of the auxiliary power source is higher than that of the main power source, power is supplied only from the auxiliary power source to the load.

According to these known techniques, a power output circuit of a capacitor, that is, a power feeding circuit for feeding power to a load, is structured as a constant voltage source. When the output of an AC-to-DC power source (main power source), which is a constant voltage source, and the output of an auxiliary power source, which is also a constant voltage source, are alternately supplied to the load using a switching circuit, there is a voltage change, at the time of switching from one power source to the other, due to the difference in output voltage of the two constant voltage sources. For example, this causes an unstable operation of a motor supplying power, and the motor may stop or rotate unsteadily. Such unsteady rotation of the motor may cause a defect in an image formed by the image forming apparatus. In the case of a color image forming apparatus, a color shift may occur.

In another background power supply device, a first power source (main power source) is a constant voltage source, and a second power source (auxiliary power source) is a constant current source. The output of the first power source and the output of the second power source are connected in parallel, and the power from the first power source and the power from the second power source are simultaneously supplied to a load. Since there is no switching from the one power source to the other, voltage changes due to the alternate feeding are suppressed.

In these power supply devices, a load current combining the currents supplied from the first and second power sources to a 24V load or the current supplied from the first power source to the 24V load is measured, and the output current of the second power source is controlled according to the measured current and the maximum current data (MCD) specified for the first power source. The second power source is required to have high responsiveness to supply a stable supply voltage to the DC load.

The load power varies depending on whether the load is turned "on" or "off" or the switching of the load value. In other words, the load power varies according to the usage of the load. This variation is, however, a long-period (low-frequency) variation and is static. For example, when one of the above-described power supply devices are used as the power source for an electrophotographic copier, the load power in a standby state waiting for a copy instruction is different from the load power in an operating state in which a printing process is performed by driving a power system in response to the copy instruction.

Even in the operating state, document scanner driving, photosensitive member driving, charger driving, sheet feeding, and developer driving are overlappingly performed one after another, resulting in increases and decreases in the load power. These increases and decreases in the load power are steady load changes involved in sequence control operations and are long-period (low-frequency), static changes. A load current including such a load change is referred to as a static load current in this specification.

In contrast, an inrush current appears in the load current when the load is switched from "off" to "on". A current induced by the reactance of a circuit appears when the load is switched from "on" to "off". An inrush current or a current induced by switching the load value appears in the load current. These currents are temporary, short-period (high-frequency) changes and are dynamic. These changes are referred to as dynamic load changes in this specification.

In case of such a dynamic load change, the second power source having high responsiveness responds to the dynamic load change and outputs current generating a high-frequency oscillation, inducing hunting. This may generate an excessive peak current or cause an unstable operation of the second power source.

SUMMARY OF THE INVENTION

This patent specification describes a novel power supply device including a first power-supply unit to input an external power and output a first power supplying a predetermined constant voltage to a load, a second power-supply unit including a storage device to accumulate charge and to output a second power from the storage device to the load in parallel with the first power being supplied from the first power-supply unit, and a controller to output a control signal to prevent the second power-supply unit from supplying power in case of a current increase due to a dynamic load change, and to cause the first power-supply unit to supply power for the dynamic current increase. The first power-supply unit supplies power having a current value smaller than a predetermined maximum current of the first power-supply unit. The second power-supply unit supplies power for a shortfall current exceeding the predetermined maximum current of the first power-supply unit.

Further, this patent specification describes a novel method for controlling a power supply device including inputting an external power to a first power-supply unit, outputting a first power supplying a predetermined constant voltage to a load, inputting the external power to a storage device provided in a second power-supply unit to accumulate charge, outputting a second power from the storage device to the load in parallel with the first power being supplied from the first power-supply unit, outputting a control signal to prevent the second power-supply unit from supplying power in case of a current increase due to a dynamic load change, and causing the first power to supply power for the dynamic current increase. Power having a current value smaller than a predetermined maximum current of the first power-supply unit is supplied by the first power-supply unit. Power for shortfall current exceeding the predetermined maximum current of the first power-supply unit is supplied by the second power-supply unit. A static load current is output to the load from a direct-to-direct-current regulator provided in the second power-supply unit in response to the control signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
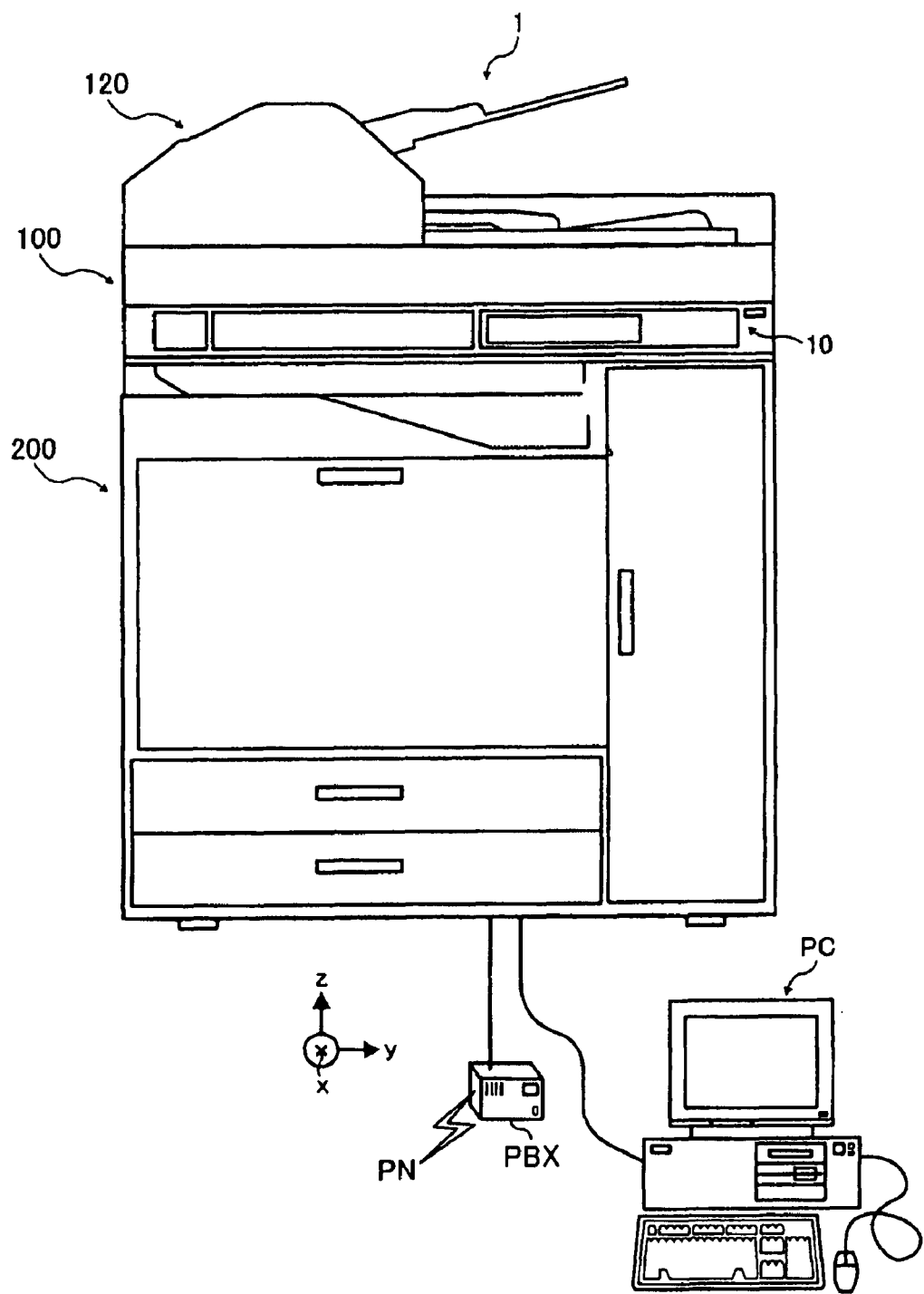
FIG. 1 illustrates a front view of a multifunctional copier according to an embodiment of the present disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 3:
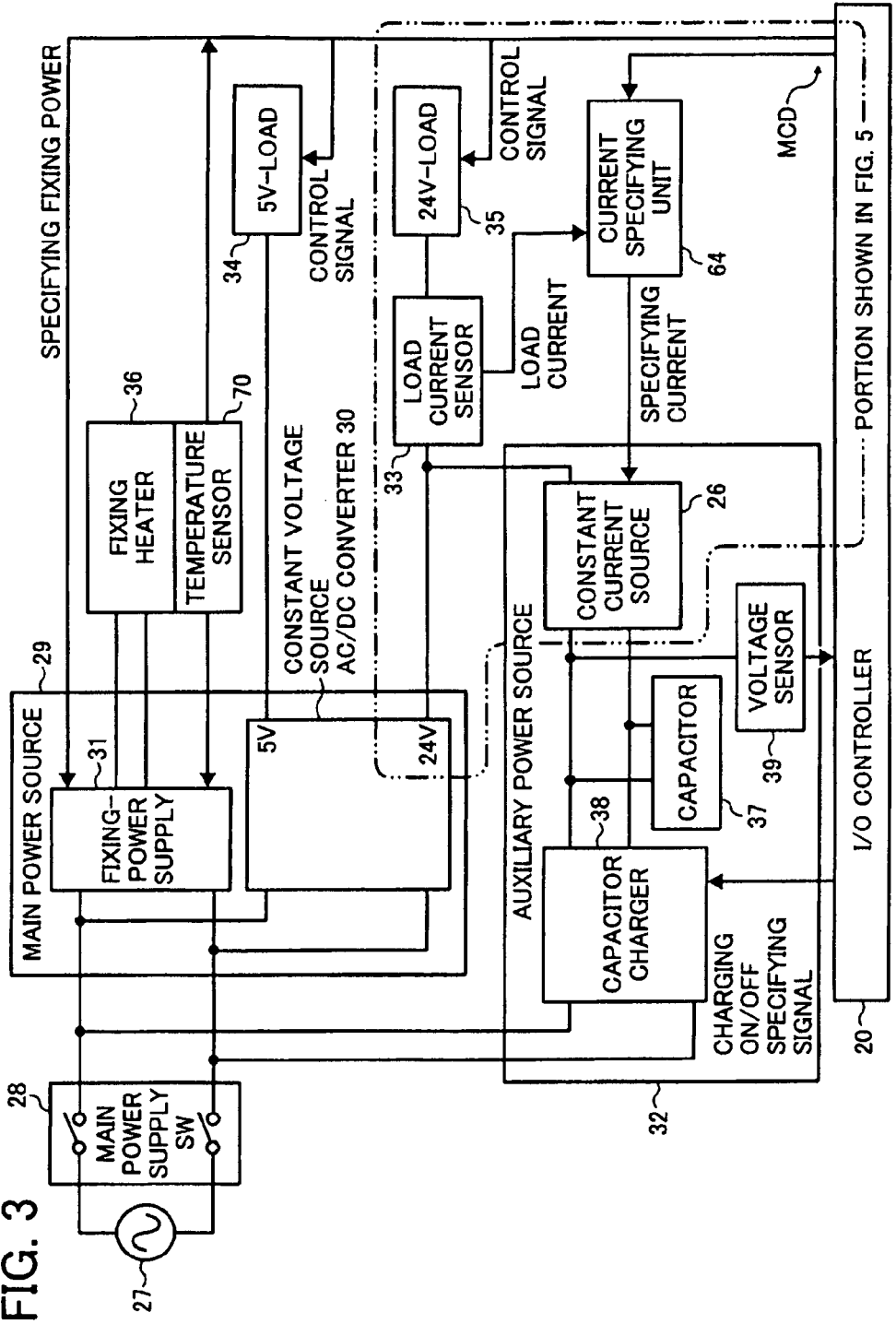
FIG. 3 illustrates a block diagram of the structure of a power supply device.

Referring now to the drawings, wherein like reference numerals designate identical or corresponding parts throughout the several views, particularly to FIG. 3, a power supply device according to an embodiment of the present invention is described.

FIG. 1 illustrates the appearance of a full-color digital multifunctional copier 1 according to an embodiment of the present invention. The main units of the full-color digital multifunctional copier 1 include an automatic document feeder (ADF) 120, an operation board 10, a color scanner 100, and a color printer 200. The color scanner 100 having the operation board 10 and the ADF 120 is a unit that can be separated from the color printer 200. The color scanner 100 has a control board (not shown) including a power device driver, a sensor input unit, and a controller. The color scanner 100 directly or indirectly communicates with an engine controller (not shown) and scans a document image under timing control. The digital multifunction copier 1 can be connected to a PC and to a network PN through a public exchange device PBX. Other ways to connect to a network PN are also possible.

Figure 2:
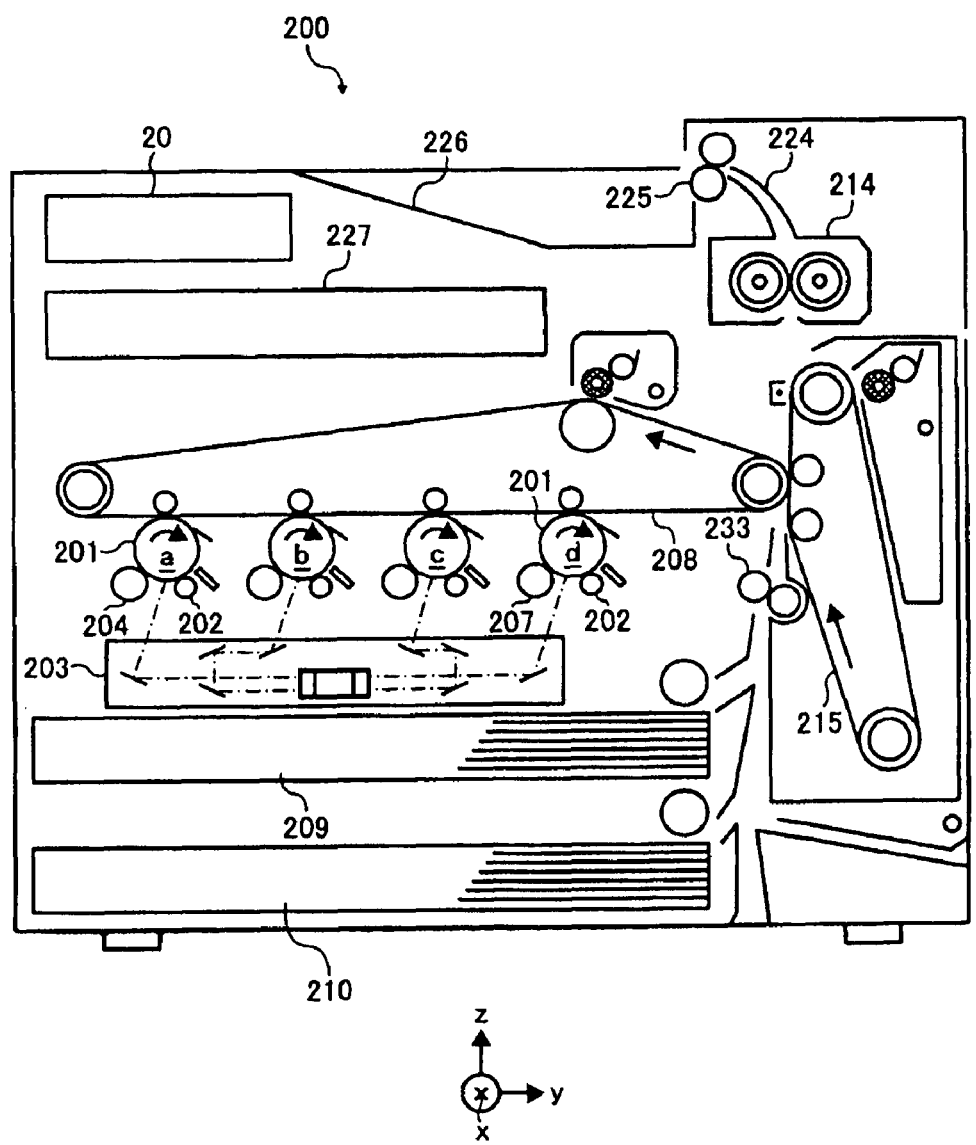
FIG. 2 illustrates an enlarged vertical sectional view of the structure of a color printer of FIG. 1.

FIG. 2 illustrates the structure of the color printer 200 of the multifunctional copier 1. The color printer 200 according to the embodiment is a laser printer. This laser printer 200 has four toner image forming units a to d for forming magenta (M), cyan (C), yellow (Y), and black (K) images, respectively. The four toner image forming units a to d are arranged in this order along the moving direction of a first transfer belt 208 (from left to right in the y direction shown in FIG. 2).

In short, the color printer 200 is a 4-drum (tandem) full-color image forming apparatus. A dielectrifier (not labeled), a cleaner (not labeled), a charger 202, and a developer 204 are placed on the outer periphery of each photosensitive member 201, which is supported so that it can rotate in the arrow direction. There is a space between the charger 202 and the developer 204 at which light information emitted from an exposing unit 203 is impinged. There are four photosensitive members 201 (a, b, c, and d). The four photosensitive members 201 have the same image forming components provided therearound but handle different toner colors. The four photosensitive members 201 are partially in contact with the first transfer belt 208. Alternatively, photosensitive belts may be used as the photosensitive members 201.

The first transfer belt 208 is supported and extends between a rotating support roller (not labeled) and a drive roller (not labeled) such that the first transfer belt 208 can move in the arrow direction. On the back of the first transfer belt 208 (inside the loop), a first transfer roller (not labeled) is arranged near each photosensitive member 201. A cleaner (not labeled) for cleaning the first transfer belt 208 is arranged outside the belt loop.

After a toner image is transferred from the first transfer belt 208 onto a transfer sheet or a second transfer belt 215, residual toner remaining on the surface of the first transfer belt 208 is removed. The exposing unit 203 uses a known laser system to irradiate the surface of each evenly charged photosensitive member 201 with light information corresponding to full-color image formation, thereby forming a latent image. Alternatively, an exposing unit including a light-emitting diode (LED) array and an imaging unit may be used as the exposing unit 203.

With continued reference to FIG. 2, the second transfer belt 215 is located on the right of the first transfer belt 208. The first transfer belt 208 and the second transfer belt 215 are in contact with each other and form a predetermined transfer nip. The second transfer belt 215 is supported and extends between a support roller (not labeled) and a driver roller (not labeled) such that the second transfer belt 215 can move in the arrow direction. On the back of the second transfer belt 215 (inside the loop), second transfer rollers (not labeled) are arranged.

Components such as a cleaner (not labeled) and a charger (not labeled) for the second transfer belt 215 are arranged outside the belt loop. This cleaner removes residual toner remaining on the second transfer belt 215 after a toner image is transferred from the second transfer belt 215 onto a sheet. Transfer sheets are piled in paper feeding cassettes 209 and 210, which are shown in the lower section of FIG. 2.

The sheet at the top is conveyed one at a time to a register roller 233 through a plurality of sheet guides. A fixing unit 214, a paper-expelling guide 224, a paper-expelling roller 225, and a paper stack 226 are arranged above the second transfer belt 215. A container 227 for storing extra toner cartridges of the four colors, namely, magenta, cyan, yellow, and black, is arranged above the first transfer belt 208 and below the paper stack 226. The developers 204 are replenished as needed with toner of the corresponding colors using a powder pump or the like.

The operation of each component in the case of double-sided or duplex printing will be described. The photosensitive members 201 form an image. Specifically, when the exposing unit 203 is activated, light emitted from a laser diode (LD) light source (not shown) is directed through an optical component (not shown) and reaches, among the four photosensitive members 201 evenly charged by the corresponding chargers 202, the photosensitive member 201 of the imaging unit a, on which a latent image corresponding to the written information (information according to a first color) is formed.

The latent image formed on the photosensitive member 201 is developed by the corresponding developer 204, and a developed toner image is formed and maintained on the surface of the photosensitive member 201. This toner image is transferred by the first transfer roller onto the surface of the first transfer belt 208 moving in synchronization with the photosensitive member 201. Residual toner on the surface of the photosensitive member 201 is removed by the corresponding cleaner, and the surface of the photosensitive member 201 is dielectrified by the dielectrifier to prepare for the next imaging cycle.

The first transfer belt 208 carries the toner image formed on its surface and moves in the arrow direction. Next, a latent image corresponding to a different next color is written onto the photosensitive member 201 of the imaging unit b, which is then developed with toner of the corresponding color to form a developed image. This image is placed over the previously developed color image on the first transfer belt 208. Eventually, four colors are placed over one another.

There may be situations in which only a single color image or a black image is formed. In such a case, the second transfer belt 215 moves in the arrow direction in synchronization with the first transfer belt 208. With the operation of the second transfer rollers, the image formed on the surface of the first transfer belt 208 is transferred onto the surface of the second transfer belt 215. While images are formed on the photosensitive members 201 of the four tandem imaging units a to d, the first transfer belt 208 and the second transfer belt 215 move to perform the imaging. As a result, the imaging time is reduced. When the first transfer belt 208 moves to a predetermined point, a toner image to be formed on the second side of the sheet is formed on the photosensitive members 201 in the above-described steps, and the sheet feeding begins.

The sheet at the top in the paper feeding cassette 209 or 210 is fed out and conveyed to the register roller 233. This sheet is conveyed through the register roller 233 and is fed between the first transfer belt 208 and the second transfer belt 215, and the toner image on the surface of the first transfer belt 208 is transferred by the second transfer rollers onto one side of the sheet. The sheet is further conveyed upward, and the toner image on the surface of the second transfer belt 215 is transferred onto the second side of the sheet by the charger. The sheet is conveyed with appropriate timing so that the image is transferred at the correct position.

The sheet having two sides onto which the toner images are transferred in the above-described steps is fed to the fixing unit 214, and the toner images on both sides of the sheet are melted and fixed at one time. The sheet is then fed through the paper-expelling guide 224 and expelled by the paper-expelling roller 225 into, and the paper stack structured 226, which is positioned in the upper portion of the main frame. With the paper-expelling guide 224, the paper-expelling roller 225, and the paper stack 226 structured as shown in FIG. 2, sheets are piled in the paper stack 226 such that the side onto which the latter of the two toner images is transferred, that is, the side onto which the toner image is directly transferred from the first transfer belt 208, faces down.

To pile the sheets in the correct way, an image for the second page is formed at first, and a toner image of this image is maintained on the second transfer belt 215. An image for the first page is then directly transferred from the first transfer belt 208 onto the sheet. The image transferred directly from the first transfer belt 208 onto the sheet is exposed so that the image becomes a normal image on the surface of each photosensitive member 201.

The toner image transferred from the second transfer belt 215 onto the sheet is exposed so that the image becomes a reversed (mirror) image on the surface of each photosensitive member 201. The imaging order and the alternate image formation of the normal and reversed (mirror) images to pile the sheets in the correct way are controlled by a controller performing reading/writing control of image data in a memory. After the image is transferred from the second transfer belt 215 onto the sheet, the cleaner including a brush roller, a recovery roller, and a blade removes dust and residual toner remaining on the second transfer belt 215.

In FIG. 2, the brush roller of the cleaner for the second transfer belt 215 can be separated from the surface of the second transfer belt 215. The brush roller is structured to rotate around a pivot and to be in and out of contact with the surface of the second transfer belt 215. The brush roller is separated from the second transfer belt 215 before the toner image is transferred onto the sheet and when the toner image is carried by the second transfer belt 215.

Where cleaning is necessary, the brush roller is rotated counterclockwise to come in contact with the second transfer belt 215. Residual toner removed from the second transfer belt 215 is collected in a toner container. This is the imaging process in a duplex printing mode in which a "duplex transfer mode" is set. To print both sides of a sheet, the printing is executed with this imaging process.

To print one side of a sheet, two modes are available: a "single-sided or simplex transfer mode" using the second transfer belt 215 and a "simplex transfer mode" using the first transfer belt 208. In the former simplex transfer mode using the second transfer belt 215, a developed image using three or four colors or a single color (black) on the first transfer belt 208 is transferred onto the second transfer belt 215, and this image is further transferred onto one side of a sheet. No image will be transferred onto the second side of the sheet. In this case, a printed side faces up in the paper stack 226. In the latter simplex transfer mode using the first transfer belt 208, a developed image using three or four colors or a single color (black) on the first transfer belt 208 is not transferred onto the second transfer belt 215, but is directly transferred onto one side of a sheet. No image will be transferred onto the second side of the sheet. In this case, a printed side faces down in the paper stack 226.

FIG. 3 illustrates the structure of a power supply device. When a main power source switch (SW) 28 is turned on, commercial AC power is supplied to a main power source 29 and an auxiliary power source 32. Of this commercial AC power, commercial AC voltage is applied to a fixing power source 31 serving as an AC control circuit and a constant voltage source 30 in the main power source 29 and to a capacitor charger 38 in the auxiliary power source 32.

Within a power range specified by a power specifying signal supplied from an input/output controller 20, the fixing power source 31 performs feedback control of the temperature of the fixing unit 214 using a fixing temperature signal supplied from a temperature sensor 70. The constant voltage source 30 serving as a first power source in the main power source 29 converts the commercial AC voltage into DC voltage, generates two DC constant voltages, e.g., 5V and 24V, by performing constant-voltage feedback control, and outputs the generated two DC constant voltages 5V and 24V to a 5V load 34 and a 24V load 35, respectively.

The auxiliary power source 32 according to the embodiment includes the capacitor charger 38, a capacitor 37 charged by the capacitor charger 38, and a constant current source 26 serving as a second power source that outputs the capacitor power as constant current to a power feeding line for feeding power to the 24V load 35. The auxiliary power source 32 feeds power to the 24V load 35 to reduce the AC power consumption corresponding to an increase in the amount of power supplied to a fixing heater 36.

This is implemented by reducing the DC power consumption (corresponding to the aforementioned increase) of the constant voltage source 30 and allowing the second power source to supply power in return for the reduced amount, thereby preventing the AC power source from being overloaded. According to the embodiment, an increase (e.g., 300 W) in the amount of power supplied to the fixing heater 36 is taken into consideration, and the auxiliary power source 32 is designed to supply power to the 24V load 35 whose power consumption is, for example, 500 W and is larger than that of the 5V load 34 (e.g., 100 W). Alternatively, the auxiliary power source 32 may supply power to the 5V load 34 when the increase in the amount of power supplied to the fixing heater 36 is small or when the 5V load 34 consumes a large amount of power.

A load current sensor 33 measures the current of the 24V load 35, which is the sum of current simultaneously supplied from the constant voltage source 30 (first power source) and the constant current source 26 (second power source), and supplies a current measurement signal to a current specifying unit 64. In addition, the input/output controller 20 supplies maximum current data (MCD) specifying the maximum output current of the constant voltage source 30 to the current specifying unit 64.

The current specifying unit 64 supplies a current specifying signal indicating the difference obtained by subtracting the specified maximum current from the current of the 24V load 35 (the difference equals an output current specified for the constant current source 26) to the constant current source 26. The constant current source 26 supplies power derived from charge accumulated in the capacitor 37 as constant current to a 24V load line by performing a constant-current control operation targeted at the current specified by the current specifying signal.

The capacitor 37 in the auxiliary power source 32 includes large-capacitance capacitors such as electric double-layer capacitors. Besides double-layer capacitors, many other types of capacitors are selectable. According to the embodiment, the electric double-layer capacitors are used for their long life and quick charging and discharging capability. As an electric double-layer capacitor discharges, a terminal voltage (capacitor voltage) becomes lower. Therefore, the constant current source 26 is placed subsequent to the capacitor 37 so that a predetermined current can be output regardless of changes in the capacitor voltage.

Figure 4:
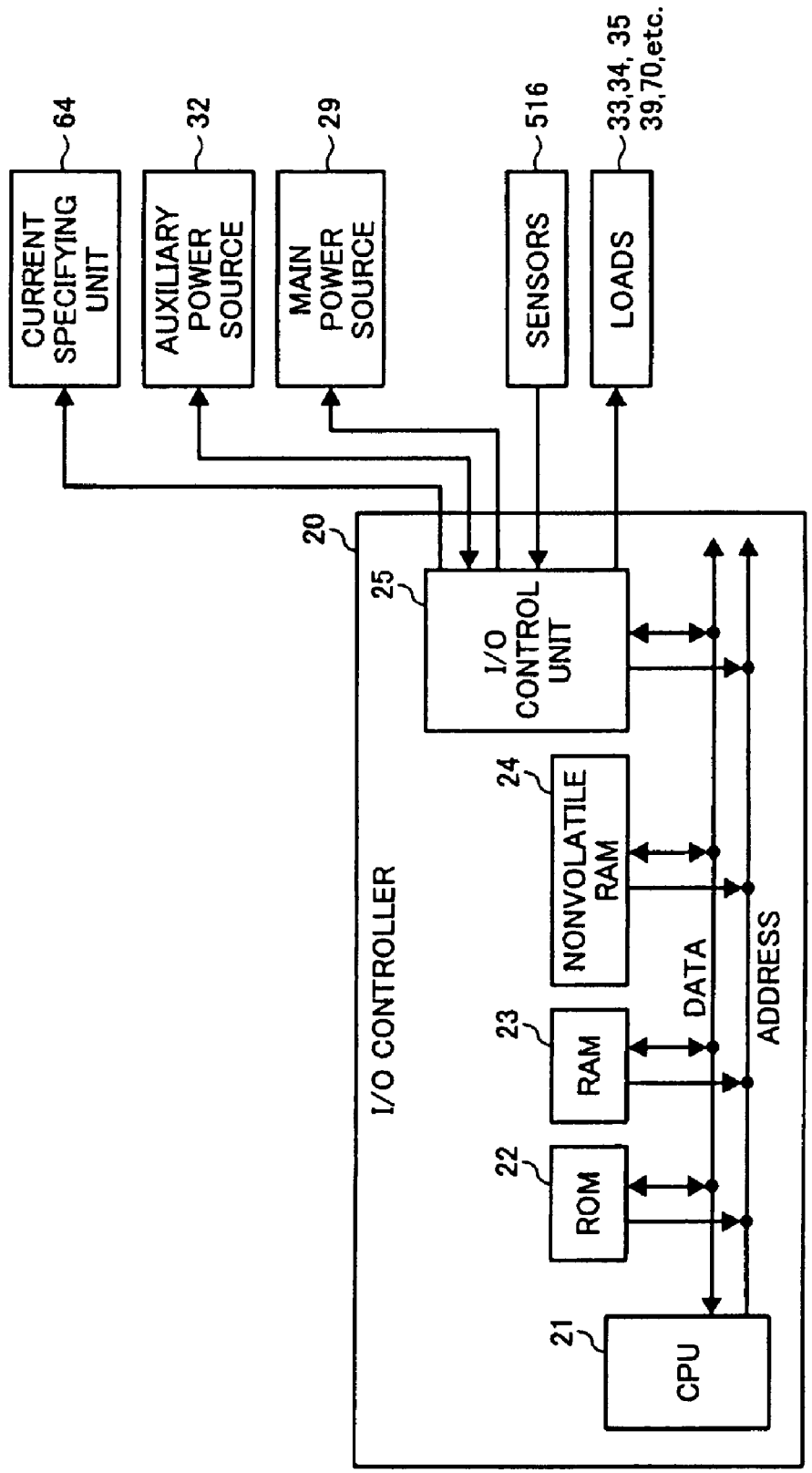
FIG. 4 illustrates a block diagram of the schematic structure of an input/output controller.

FIG. 4 is a block diagram of the structure of the input/output controller 20. The input/output controller 20 includes a CPU 21, a read-only memory (ROM) 22, a random-access memory (RAM) 23, a non-volatile RAM 24, and an input/output control unit 25. The CPU 21 controls the input and output of sensors 516 (including the load current sensor 33, a voltage sensor 39 (FIG. 3), and the temperature sensor 70) and loads (including the 5V load 34 and the 24V load 35) and controls the power supply device in accordance with a control command issued from an engine controller (not shown), a program stored in the ROM 22, and a program and data stored in the non-volatile RAM 24. The ROM 22 stores a program for allowing the CPU 21 to operate. The RAM 23 is used as a work memory for the CPU 21. The non-volatile RAM 24 stores a power consumption table and a printing time table, etc.

The power consumption table includes data indicating the operating status of each load and the power consumption in each operating mode. The printing time table includes data indicating the time required to perform a printing process in each operating mode. The input/output control unit 25 controls the input (reading) of sensors 516 in the full-color digital multifunctional copier 1 and the driving of each load.

The input/output controller 20 performs the input and output control of the sensors and loads and the power supply control in accordance with instructions involved in image reading by the engine controller, and in process and sequence control in printing and copying processes, etc. The input/output controller 20 allows the loads to operate sequentially in accordance with each operating mode. In addition, the input/output controller 20 controls the charging and discharging of the capacitor 37. At the time of activation of the device and for a predetermined period of time thereafter, the input/output controller 20 allows power derived from charge accumulated in the capacitor 37 to be supplied to the 24V load 35. Because of this power supply, a portion of the power supplied from an AC power line 27 is spared and additionally supplied to the fixing heater 36, thereby increasing the amount of power supplied to the fixing heater 36.

Figure 5:
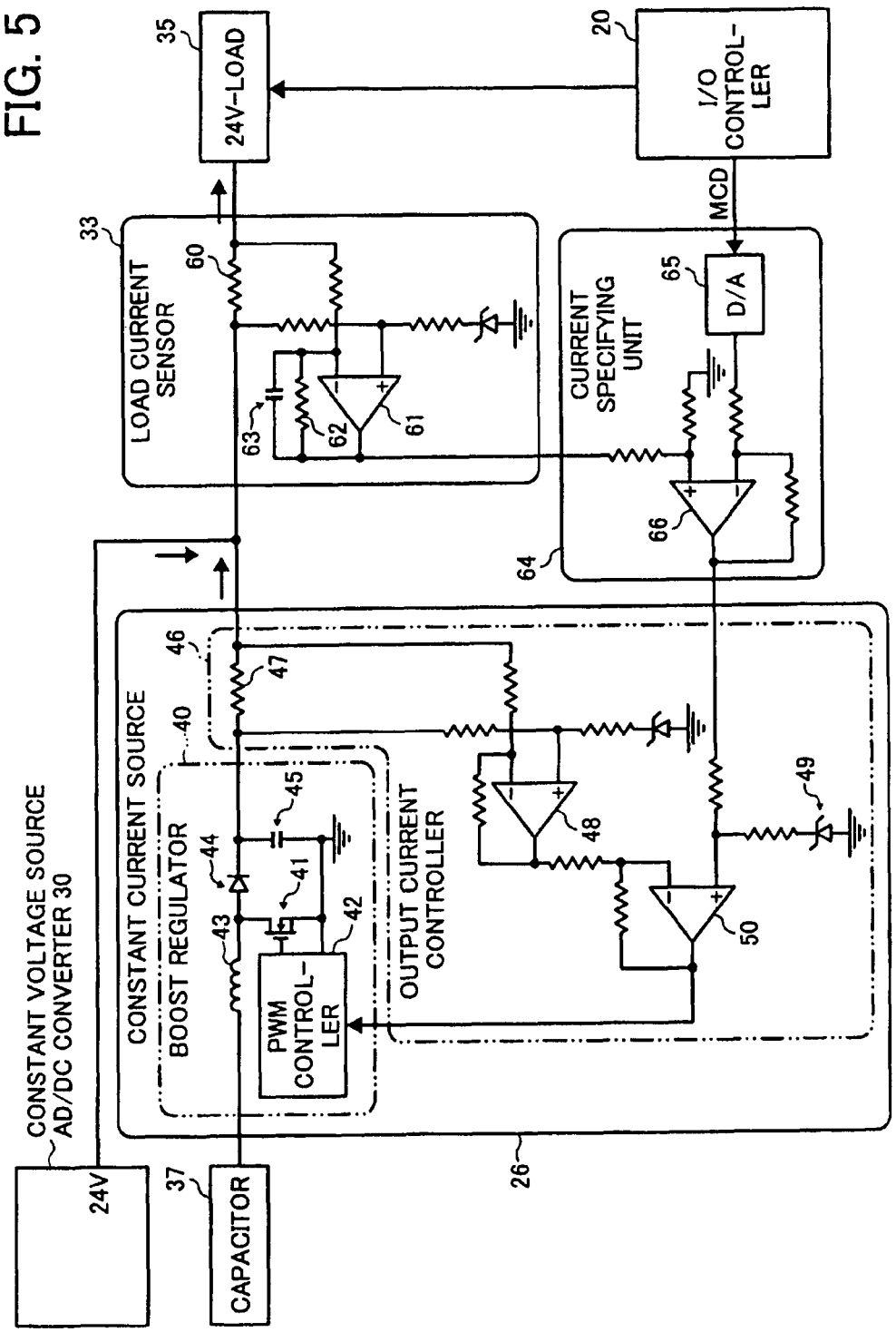
FIG. 5 illustrates an electrical circuit diagram of the structure of a constant current source, a load current sensor, and a current specifying unit of FIG. 3.

FIG. 5 illustrates the detailed structure of the constant current source 26, the load current sensor 33, and the current specifying unit 64. According to the embodiment, the capacitor 37 includes electric double-layer capacitors. The withstand voltage of electric double-layer capacitors is relatively low, and the operational maximum charging voltage thereof is 2.5V. Therefore, it is necessary to have a series connection of many such capacitors to obtain a high voltage. However, the same capacitance is achieved at a lower cost when fewer large-capacitance capacitors are used in comparison to using many small-capacitance capacitors connected in series.

When nine or fewer series-connected electric double-layer capacitors are used, the maximum charging power is 22.5V or lower. It is thus necessary to construct the constant current source 26 using a booster regulator to supply power to the 24V load 35. According to the embodiment, a boost regulator 40 is used to boost the voltage of the capacitor 37, thereby outputting constant current.

A semiconductor switch 41 of the boost regulator 40 is turned on in a high (H) period of a pulse-width-modulated (PWM) pulse output from a PWM controller 42, and is turned off in a low (L) period thereof. When the switch 41 is turned on, current flows from the capacitor 37 to the switch 41 through a reactor 43, and the reactor 43 is charged.

When the switch 41 is turned off, power derived from charge accumulated in the reactor 43 is supplied at a high voltage through a diode 44 and accumulated in a capacitor 45, which is charged with the high voltage. The voltage stored in the capacitor 45 increases due to repeated cycles of turning on and off the switch 41 in accordance with the PWM pulse. This power is supplied to the 24V load 35 through a current sensing resistor 47 and through a current sensing resistor 60 in the load current sensor 33.

In the load current sensor 33, a potential difference between two ends of the current sensing resistor 60 is amplified by a differential amplifier 61 to generate a load current signal proportional to the load current, and the load current signal is output (applied) to the current specifying unit 64. A feedback resistor 62 of the differential amplifier 61 is connected in parallel to a capacitor 63 to constitute an integrator circuit (low-pass filter). According to the embodiment, with the addition of the low-pass filter, the differential amplifier 61 generates a load current signal by cutting off a current component due to a dynamic load change in the voltage across the current sensing resistor 60 (voltage of the measured current) and extracting a static load current component and outputs the load current signal.

In the current specifying unit 64, a digital-to-analog (D/A) converter 65 converts the maximum current data (MCD) supplied from the input/output controller 20 into an analog maximum specifying signal (voltage), and a differential amplifier 66 subtracts the specified maximum current from the measured load current and outputs the differential voltage indicating the calculation result as a current specifying signal to the constant current source 26. That is, the current specifying unit 64 specifies, to the constant current source 26, the difference obtained by subtracting the maximum output current of the constant voltage source 30, which is specified by the input/output controller 20, from the measured load current of the 24V load 35 (static load current) as a target current (static current target output) that should be supplied from the constant current source 26.

In the constant current source 26, a differential amplifier 48 amplifies a potential difference between two ends of the current sensing resistor 47 to generate an output current signal proportional to the output current, and the output current signal is supplied to a differential amplifier 50. The differential amplifier 50 amplifies the difference between the target current, which is supplied from the current specifying unit 64, and the output current signal, and the level of the amplified differential voltage is limited by a Zener diode 49 such that an abnormal high output voltage can be avoided. This limited voltage is supplied as a duty specifying signal for the PWM pulse to the PWM controller 42.

The PWM controller 42 assigns the duty cycle specified by the duty specifying signal to the duty cycle of the PWM pulse based on whether the switch 41 is turned on or off. That is, the duty cycle of the PWM pulse is increased when the output signal of the current specifying unit 64 increases and the output voltage of the differential amplifier 50 increases. This causes an increase in the output current of the boost regulator 40. As a result, a voltage drop across the current sensing resistor 47 increases, the level of the output current measurement signal becomes higher, and the output voltage of the differential amplifier 50 decreases.

This reduces the duty cycle of the PWM pulse. As a result, the output current of the boost regulator 40 decreases. With such a feedback PWM control operation, the output current of the boost regulator 40 is a value corresponding to the difference supplied from the current specifying unit 64, which is obtained by subtracting the output maximum current data (MCD) of the constant voltage source 30, which is specified by the input/output controller 20, from the measured static load current of the 24V load 35.

Figure 6A:
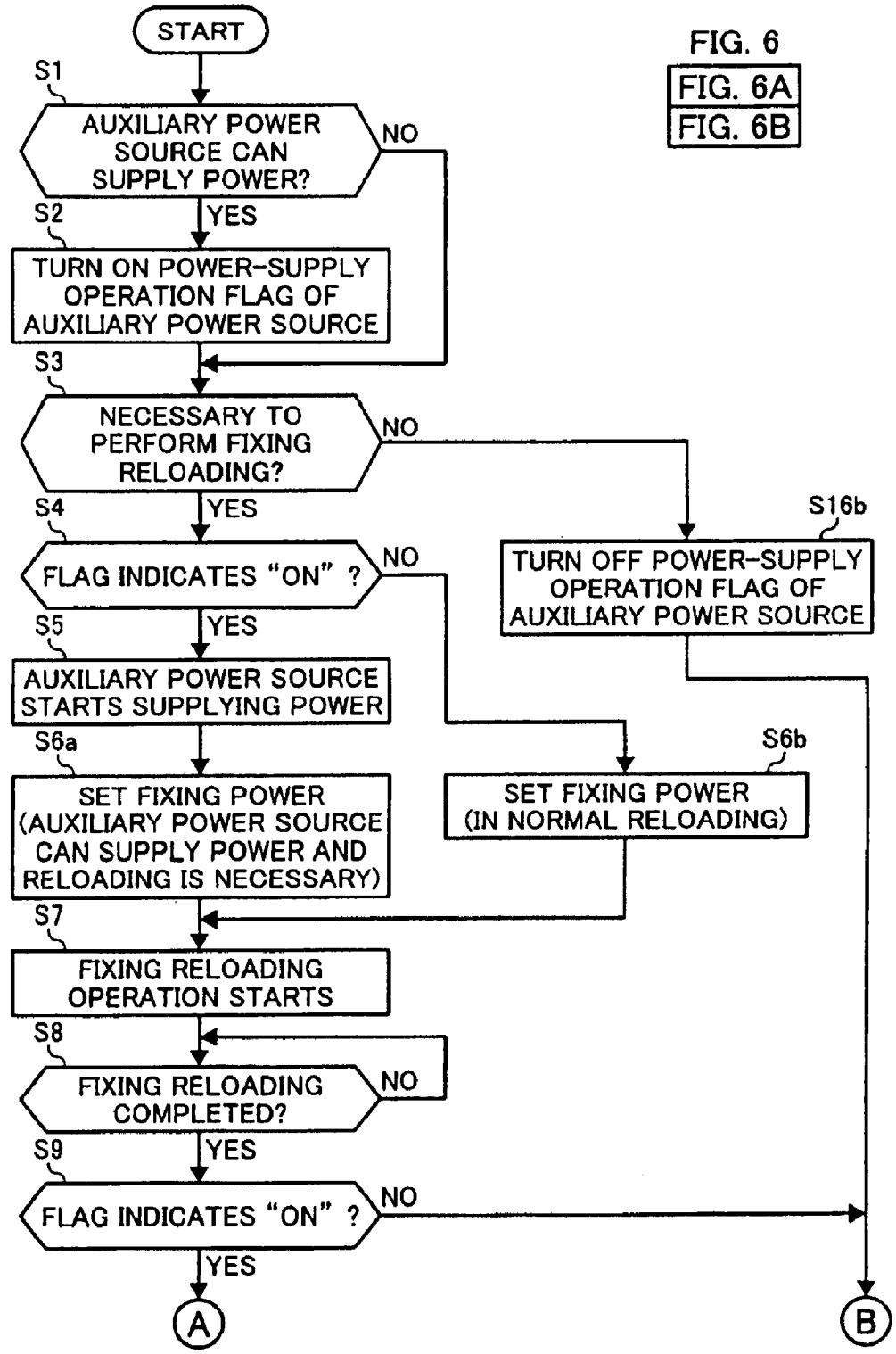
FIGS. 6A and 6B illustrate a flowchart showing the outline of a feeding control operation.
Figure 6B:
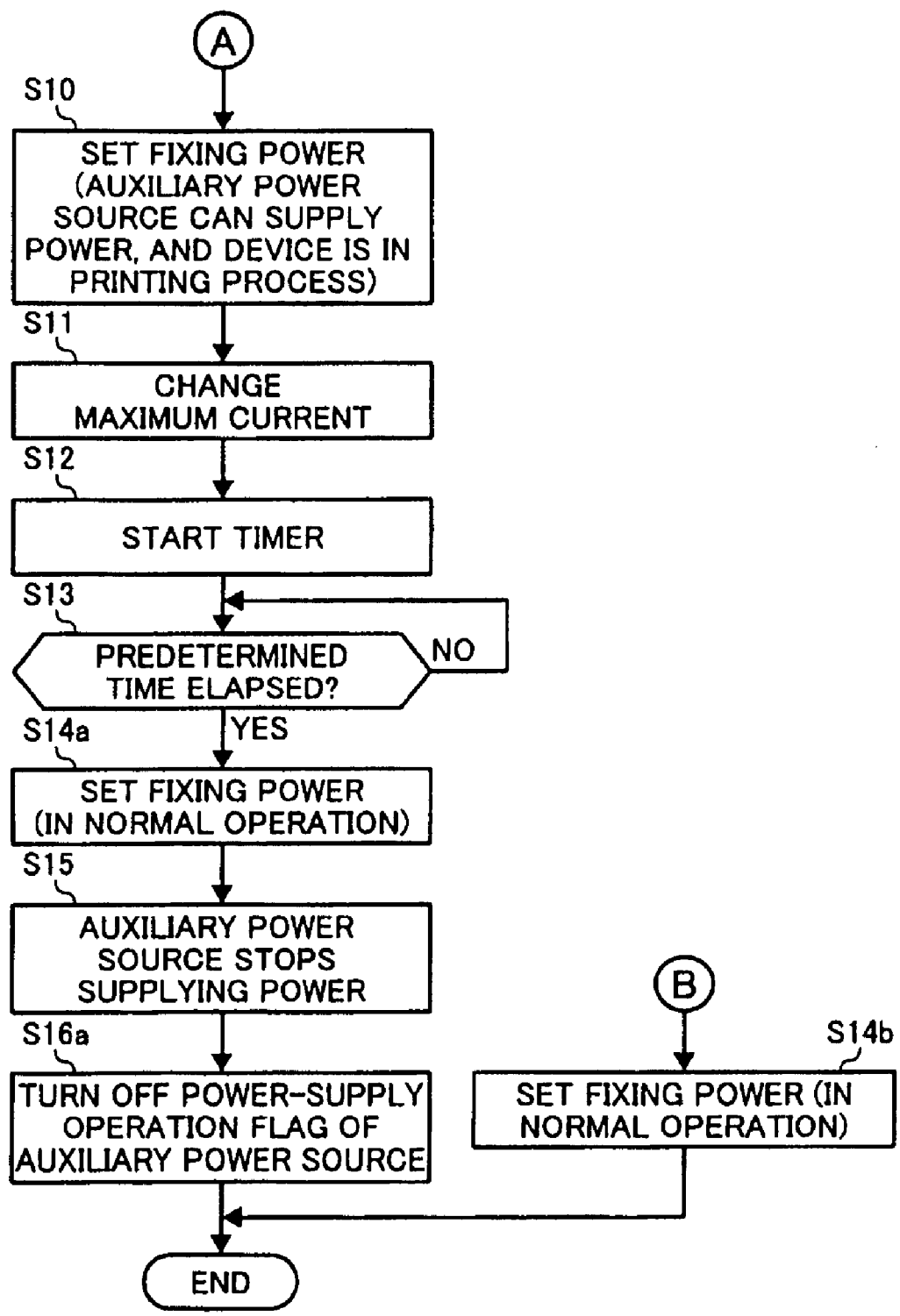

FIGS. 6A and 6B schematically illustrate the operation of the input/output controller 20 controlling the power supply (output) of the constant current source 26. When the main power source switch 28 is turned from "on" to "off" or when the multifunctional copier 1 returns from a power saving mode to a standby mode, the constant voltage source 30 starts supplying a +5V voltage (operating voltage), which is applied to the CPU 21 of the input/output controller 20, and the CPU 21 initializes the input/output controller 20 in response to a power-on resetting pulse.

Thereafter, the (CPU 21 of the) input/output controller 20 executes a power supply control operation shown in FIGS. 6A, 6B. In step S1, the voltage sensor 39 (FIG. 3) measures the voltage charged in the capacitor 37 in the auxiliary power source 32 and determines whether this voltage is at a level sufficient for supplying power. When it is determined that the amount of voltage charged in the capacitor 37 is sufficient for supplying power (YES in S1), a power-supply flag of the auxiliary power source 32 is turned on (S2). Next, the status of the device is measured (S3). For example, the temperature sensor 70 (FIG. 3) measures the temperature of the fixing unit 214 (S3).

Immediately after the main power source switch 28 has been turned on, or when the multifunctional copier 1 returns from an off mode (power saving mode) and the fixing temperature of the fixing heater 36 in the fixing unit 214 is low, it is determined that a high-power fixing reloading operation must be performed to increase the amount of power supplied to the fixing unit 214 to immediately increase the fixing temperature. In such a case, measures must be taken to avoid overloading of the AC power source in the case of an increase in the amount of power supplied to the fixing heater 36. That is, the amount of power supplied from the constant voltage source 30 to the 24V load 35 (AC power consumption of the constant voltage source 30) must be reduced, and the auxiliary power source 32 must supply additional power in return for the reduced amount.

Therefore, whether the auxiliary power source 32 is currently able to supply power is determined by referring to the status flag indicating "on" or "off" (S4). When the status flag indicates "on" (YES in S4), the auxiliary power source 32 starts supplying power (S5).

Figure 7A:
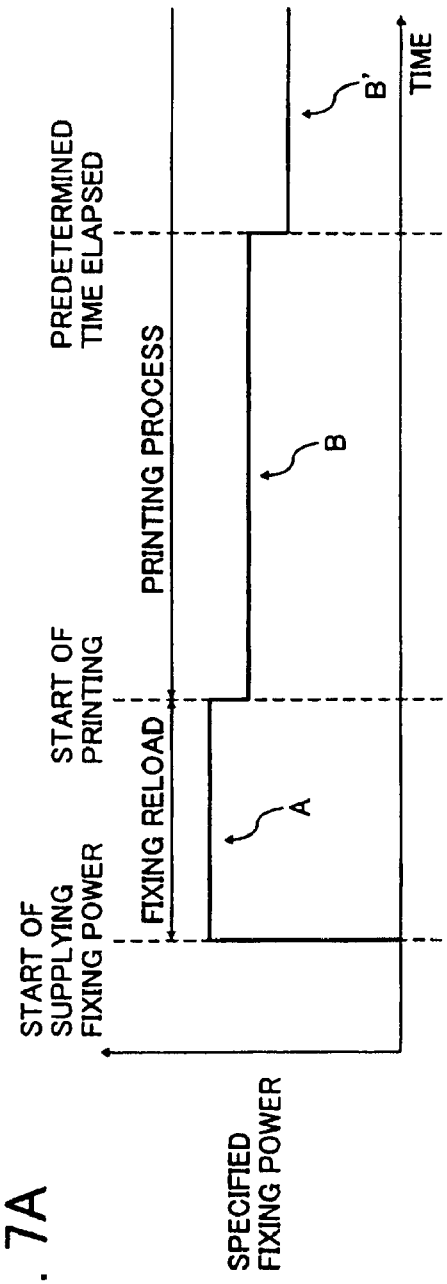
FIGS. 7A to 7E illustrate time charts showing the relationship among specified fixing power, the 24V maximum output current of the constant voltage source, the current of a load, the 24V output current of the constant voltage source, the output current of the constant current source, and the AC power input to the power supply device.
Figure 7B:
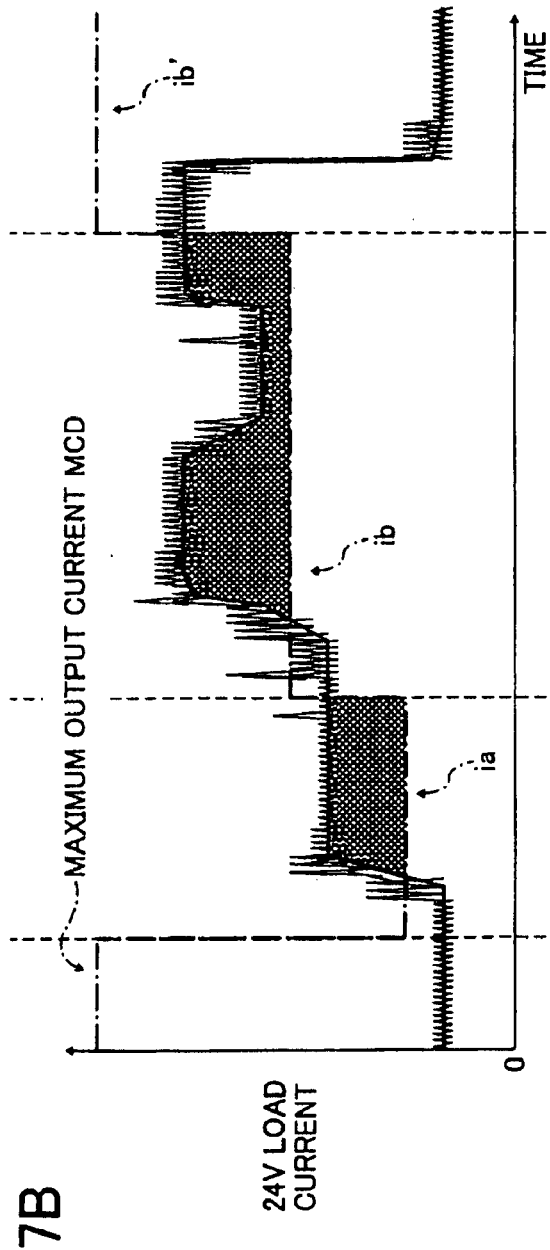
Figure 7C:
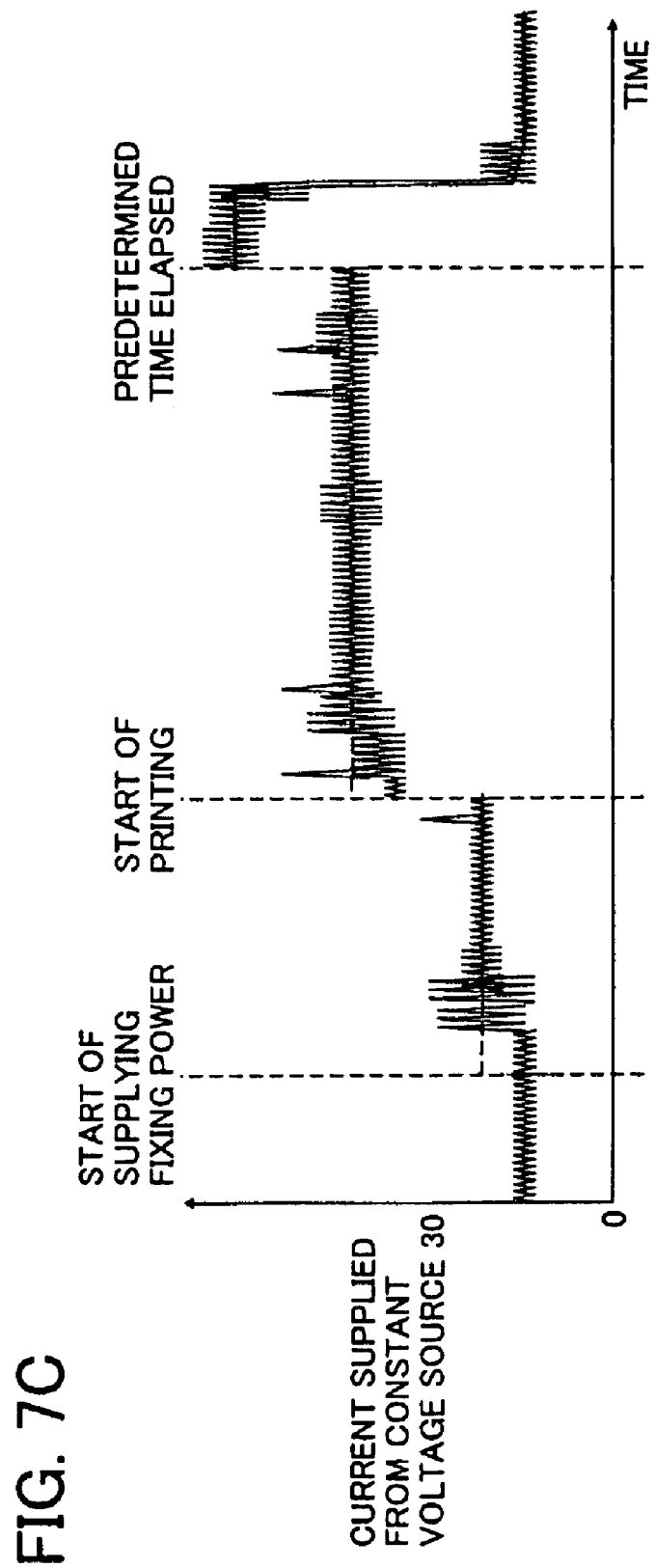
Figure 7D:
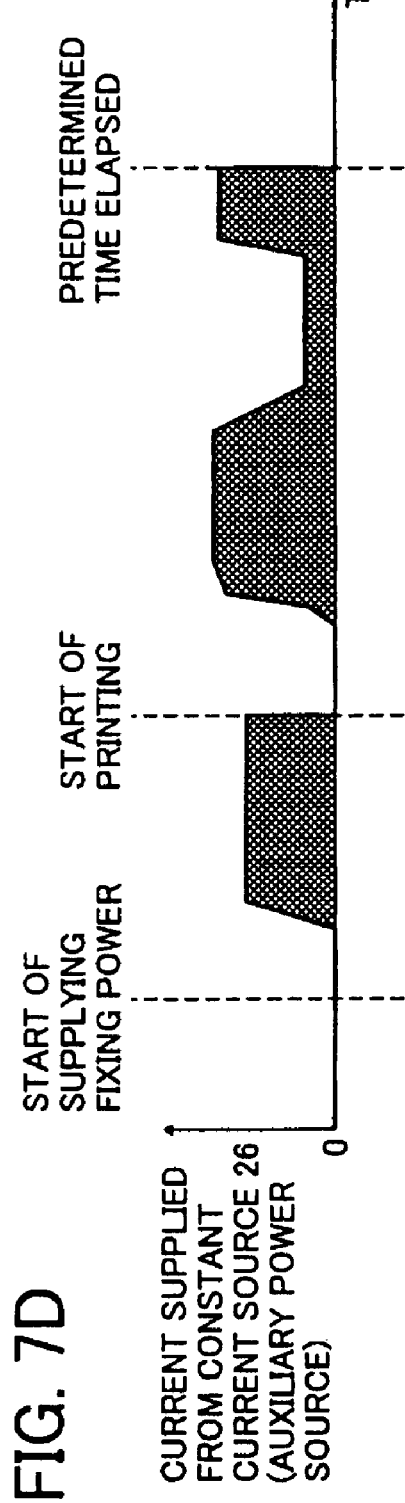

At this point, the maximum current data (MCD) set to the constant voltage source 30 is a low current ia shown in FIG. 7B. The operation then proceeds to step S6a, and the power supplied to the fixing power supply 31 is increased to the maximum power supply A (FIG. 7A) in response to a fixing power instruction. Then, a fixing reloading operation starts (S7). The following description will be given with additional reference to FIGS. 7A-7E.

Figure 7E:
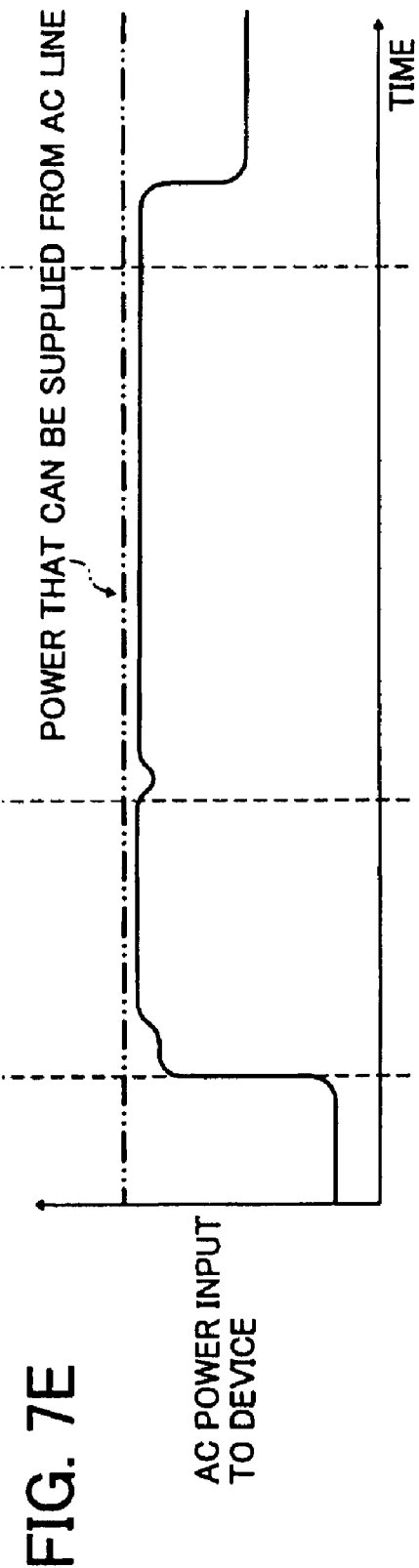

FIGS. 7A-7E are graphs showing transition from the rising from the standby mode to the operating mode of the multifunctional copier 1. Specifically, the graphs illustrate transition histories of fixing power A, B, . . . specified for the fixing power source 31 (FIG. 7A), the current of the 24V load 35 (FIG. 7B), the current supplied from the constant voltage source 30 (FIG. 7C), the current supplied from the constant current source 26 (FIG. 7D), and the power input to the multifunctional copier 1 (AC power consumption of the multifunctional copier 1) (FIG. 7E).

When the status flag indicates "off" in step S4 (NO in S4), the fixing power supply is set to power used in a normal, low-power fixing reloading operation in which no power is supplied from the auxiliary power source 32 (not shown in FIGS. 7A-7E) (S6b), and the fixing reloading operation starts (S7). When the completion of the fixing reloading operation is recognized in response to a notification from the fixing power source 31 or by checking the temperature sensor 70 for the fixing temperature (YES in S8), the status flag is checked again (S9).

When the status flag indicates "on" (YES in S9), a fixing power specifying signal is issued to the fixing power source 31 to change the fixing power supply to power B used in a printing process in which power is additionally supplied from the auxiliary power source 32 (S10). The maximum current data (MCD) set to the constant voltage source 30 is changed to a high current ib, which is a preset current during the print operation (S11). Thereafter, a timer is activated (S12), and, when it is confirmed that a predetermined period of time has elapsed (YES in S13), the fixing power supply is changed to low power B' used in a normal printing process (S14a), and the maximum current data (MCD) is changed to a significantly large current ib', thereby stopping the power supply from the auxiliary power source 32 (S15). Finally, the status flag is changed back to "off" (S16a), and the power supply control of the auxiliary power source 32 is ended.

When the fixing temperature measured by the temperature sensor 70 is greater than or equal to a predetermined temperature and it is thus determined that a fixing reloading operation is unnecessary, or when the status flag indicates "off" after the completion of the fixing reloading operation, the fixing power supply is changed to the power B used in a normal printing process (S14b), and the control operation ends.

Next, the outline of transition of the output current of the constant current source 26 will be described. In a fixing reloading period, which is immediately after the main power source switch 28 has been turned on, during which the fixing temperature is increased to a target temperature, power (e.g., A=1300 W) greater than that in a normal operation is supplied to the fixing heater 36 to increase the fixing temperature of the fixing heater 36 to a printable level as quickly as possible, thereby satisfying the required rising time (short period of time) of the multifunctional copier 1. This act of increasing the fixing temperature to a printable level is referred to as "fixing reloading". Power is supplied to the 24V load 35 simultaneously from both the constant voltage source 30 and the constant current source 26.

In this way, while the AC power consumption of the constant voltage source 30 is reduced, the amount of AC power allocated to the fixing power source 31 is increased, thereby increasing the power supplied to the fixing heater 36 and reducing the rising time. At this point, the output maximum current data (MCD) is the specified current ia, which is computed by subtracting, from the power that can be supplied from the AC power line 27, the power allocated to the fixing power source 31, the "amount of power corresponding to a dynamic change of the 24V load 35", and the power supplied to the 5V load 34.

The current to be supplied from the constant current source 26 is the difference obtained by subtracting the current set as the output maximum current data (MCD) from the DC load current from which a dynamic change in load current is removed, that is, from the static load current. Specifically, the frequency of a change in load current that cannot be measured by the load current sensor 33 may be set to a high frequency greater than or equal to the frequency of a dynamic change in load current, such as an inrush current or the like at the start of operation of the DC load (for example, the frequency of such an inrush current has a cycle of 100 ms). In other words, the load current sensor 33 measures a low frequency less than or equal to the frequency of a static change in load current, which is a steady change in load current determined by the activation/deactivation of the DC load.

The above-described "amount of power corresponding to a dynamic change of the 24V load 35" defining the maximum current data (MCD) is the smoothed value (envelop value or integral value) of the dynamic load change, and is not the peak thereof. The constant voltage source 30 has the ability to supply sufficient power such that, even in case of a load change, the constant voltage source 30 can supply constant voltage to the 24V load 35, without causing adverse effects on the AC power source.

The constant voltage source 30 has an output capacitor, and power derived from charge accumulated in the output capacitor compensates for power at the peak of a dynamic load change. Should a dynamic change in load current occur, an increase by the smoothed value (integral value α) can be absorbed by including the smoothed value (integral value α) in the maximum current data (MCD), and hence, no adverse effects occur in the AC power line 27.

Once the fixing heater 36 reaches a temperature at a printable level, this temperature level can be maintained even when power supplied to the fixing heater 36 is less than that supplied during the fixing reloading operation. However, due to the sheet running at the start of printing after the completion of the fixing reloading operation, the fixing temperature decreases greatly. It is therefore necessary to increase the power supplied to the fixing heater 36 to a level greater than that in the normal printing process until the temperature becomes stable.

During the printing process, the power consumption of the 24V load 35 increases due to the activation of a motor or the like, and hence, the total amount of power, including the power supplied to the fixing heater 36, may exceed the amount of power that can be supplied from the AC power line 27. Therefore, the power allocated to the fixing heater 36 is reduced to a level (e.g., B=1200 W), which is lower than that in the fixing reloading operation, but greater than that (e.g., B'=900 W) supplied in the normal printing process.

The differential voltage from the voltage supplied in the fixing reloading operation is added to the constant voltage source 30, thereby increasing the power that can be supplied to the 24V load 35 (ib in FIG. 7B). In other words, the maximum current data (MCD) given from the input/output controller 20 to the current specifying unit 64 is changed to the current ib, which is larger than the current ia in the fixing reloading operation, and the AC power consumption is reduced to less than or equal to the amount of power that can be supplied from the AC power line 27.

The constant current source 26 supplies current to the 24V load 35, the amount of which corresponds to the insufficiency of the output current of the constant voltage source 30 to keep the AC power consumption immediately below the maximum amount that can be supplied.

Since the auxiliary power source 32 can accumulate only a limited amount of power, the auxiliary power source 32 cannot supply power continuously. After a predetermined period of time during which the fixing temperature becomes stable, the maximum current data (MCD) is increased to the large current ib' such that only the constant voltage source 30 supplies power to the 24V load 35, and the power supply from the constant current source 26 is stopped. At this point, the power supplied to the fixing heater 36 is changed to the power B' in the normal printing process.

The period during which the auxiliary power source 32 supplies power, that is, the period during which the fixing temperature becomes stable, is defined in terms of time or the number of sheets printed. This value may be fixed or variable. In the latter case, the time during which the auxiliary power source 32 supplies power can be set in accordance with the time required for the fixing temperature to become stable, which is assumed to vary according to the operating mode of the multifunctional copier 1. Accordingly, the power of the auxiliary power source 32 can be put to more effective use.

As described above, the power supply device according to the embodiment measures the load current supplied to the 24V load 35. A portion of the load current exceeding the maximum current data (MCD) specified for the constant voltage source 30 is set as the current of the constant current source 26. The constant current source 26 is thus required to have high responsiveness. With low responsiveness, the output voltage of the constant current source 26 may exceedingly increase or decrease to satisfy the required output current amount. In other words, so-called "hunting" occurs, which may induce voltage changes including spike noise or the like in the power line supplying power to the load.

Due to the hunting, the peak of the output current of the constant current source 26 may be reduced in level. To compensate for this reduction, the amount of current supplied from the constant voltage source 30 may have a high peak, possibly exceeding the amount of power that can be supplied from the AC power line 27. To avoid such problems, the load current sensor 33 includes the integrator circuit (low-pass filter) such that an instantaneous (dynamic) change in load current is not measured. As a result, the transition of the current specifying signal supplied to the constant current source 26 becomes smoother. Specifically, only a static load current is measured. The constant current source 26 does not supply a dynamic load current component. Therefore, the peak of the output current of the constant current source 26 is reduced. With this structure, a stable current can be supplied from the constant current source 26 to the load in the power supply device. Furthermore, the responsiveness required for the constant current source 26 is reduced, and the cost of the constant current source 26 is also reduced.

Figure 8:
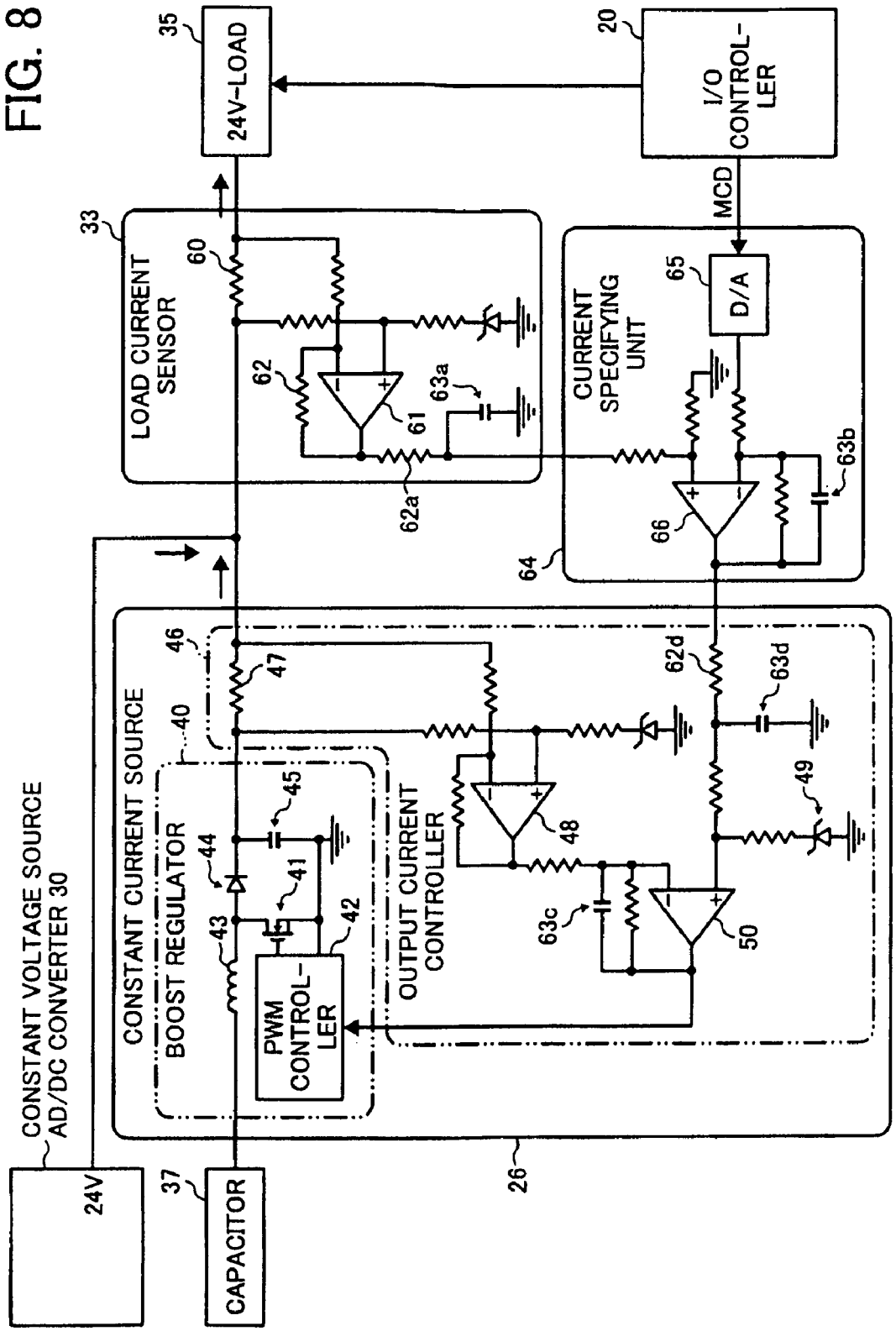
FIG. 8 illustrates an electrical circuit diagram of the structure of the constant current source, the load current sensor, and the current specifying unit according to a modification of the present disclosure.

According to the above-described embodiment, the integrator circuit (low-pass filter) is structured by connecting the capacitor 63 in parallel to the feedback resistor 62 of the differential amplifier 61 in the load current sensor 33. Alternatively, as shown in FIG. 8, similar advantages can be achieved by constructing an integrator circuit (low-pass filter) by connecting a resistor 62a in series to the output of the differential amplifier 61 and a capacitor 63a between the output of the differential amplifier 61 and the ground. In this case, the constant of an external resistor of the differential amplifier 66 in the current specifying unit 64 at a subsequent stage must be taken into consideration to determine the constant of resistance.

Alternatively, similar advantages can be achieved by an integrator circuit structured by connecting a capacitor 63b or 63c in parallel to a feedback resistor of the differential amplifier 66 in the current specifying unit 64 or to a feedback resistor of the differential amplifier 50 in an output current controller 46 in the constant current source 26, or by an integrator circuit structured by connecting a resistor 62d to the output of the differential amplifier 66 in the current specifying unit 64 and a capacitor 63d between the output of the differential amplifier 66 and the ground.

These aspects fall within the scope of the embodiment of the present invention. In these aspects, however, the operation of a signal generator up to the integrator circuit may become unstable, thereby causing noise or the like. It is thus preferable to take measures to avoid such problems in these aspects. Therefore, the above-described embodiment is regarded as more appropriate.

Numerous additional modifications and variations are possible in light of the above teachings. It is therefore to be understood that within the scope of the appended claims, the disclosure of this patent specification may be practiced otherwise than as specifically described herein.

What is claimed is:

1. A power supply device, comprising:
   a first power-supply unit configured to receive an input external power and to output a first power supplying a predetermined constant voltage to a load; and
   a second power-supply unit including a storage device to accumulate charge and configured to output a second power from the storage device to the load in parallel with the first power being supplied from the first power-supply unit,
   wherein the first power-supply unit supplies power having a current value smaller than a predetermined maximum current of the first power-supply unit,
   wherein the second power-supply unit supplies power for a shortfall current exceeding the predetermined maximum current of the first power-supply unit, and
   further comprising a controller to control the first power-supply unit to increase its supply of power up to its maximum current in case of a current increase due to a dynamic load change.

2. A power supply device, comprising:
   a first power-supply unit configured to receive an input external power and to output a first power supplying a predetermined constant voltage to a load;
   a second power-supply unit including a storage device to accumulate charge and configured to output a second power from the storage device to the load in parallel with the first power being supplied from the first power-supply unit; and
   a controller configured to output a control signal to prevent the second power-supply unit from supplying power in case of a current increase due to a dynamic load change, and to cause the first power-supply unit to supply power for the dynamic current increase,
   wherein the first power-supply unit supplies power having a current value smaller than a predetermined maximum current of the first power-supply unit,
   wherein the second power-supply unit supplies power for a shortfall current exceeding the predetermined maximum current of the first power-supply unit, and
   wherein the second power-supply unit includes a direct-to-direct-current regulator to output a static load current in response to the control signal.

3. The power supply device of claim 2, wherein the controller includes:

a current sensor to detect a load current being supplied to the load, a current specifying controller to generate a current-specifying signal indicating a difference obtained by subtracting the predetermined maximum current from the detected load current, and an output-current controller to generate the control signal to cause the direct-to-direct-current regulator to output a current specified by the current specifying controller.

4. The power supply device of claim 3, wherein the current sensor includes an amplifying unit to output a current signal to the current specifying controller to prevent the second power-supply unit from supplying power in case of the current increase due to the dynamic load change and to cause the second power-supply unit to supply power for a static load operation based on the detected load current.

5. The power supply device of claim 4, wherein the current sensor further includes:

a converting mechanism to detect the load current and convert the detected load current to a current signal, wherein the amplifying unit amplifies and outputs the current signal.

6. The power supply device of claim 5, wherein the converting mechanism includes resistors, and wherein the amplifying unit includes a differential amplifier with an integrator circuit as a feedback circuit and that amplifies a potential difference between two ends of one of the resistors.

7. An image forming apparatus which employs the power supply device of claim 2.

8. A method for controlling a power supply device, the method comprising:

inputting an external power to a first power-supply unit;

outputting a first power supplying a predetermined constant voltage to a load;

inputting the external power to a storage device provided in a second power-supply unit to accumulate charge;

outputting a second power from the storage device to the load in parallel with the first power being supplied from the first power-supply unit;

outputting a control signal to prevent the second power-supply unit from supplying power in case of a current increase due to a dynamic load change; and causing the first power to supply power for the dynamic current increase, wherein power having a current value smaller than a predetermined maximum current of the first power-supply unit is supplied by the first power-supply unit, wherein power for shortfall current exceeding the predetermined maximum current of the first power-supply unit is supplied by the second power-supply unit, and wherein a static load current is output to the load from a direct-to-direct-current regulator provided in the second power-supply unit in response to the control signal.

9. The method for controlling a power supply device of claim 8, further comprising:

detecting a load current being supplied to the load;

generating a current-specifying signal indicating a difference obtained by subtracting the maximum current from the detected load current; and generating the control signal to cause the direct-to-direct-current regulator to output a current specified with the current-specifying signal.

10. The method for controlling a power supply device of claim 9, further comprising:

outputting a current signal to prevent the second power-supply unit from supplying power in case of the current increase due to the dynamic load change and causing the second power-supply unit to supply power for a static load operation based on the detected load current.

11. The method for controlling a power supply device of claim 10, further comprising:

converting the detected load current to a current signal; and amplifying and outputting the current signal.

12. The method for controlling a power supply device of claim 11, further comprising:

amplifying a potential difference between two ends of a resistor provided in a feedback circuit of an integrator circuit of an amplifier.

* * * * *